(12) United States Patent
Purkayastha et al.

(10) Patent No.: US 11,812,313 B2
(45) Date of Patent: Nov. 7, 2023

(54) DATA FORWARDING DURING INTER-SYSTEM HANDOVERS

(71) Applicant: QUALCOMM Incorporated, San Diego, CA (US)

(72) Inventors: Punyaslok Purkayastha, San Diego, CA (US); Xipeng Zhu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 179 days.

(21) Appl. No.: 17/444,804

(22) Filed: Aug. 10, 2021

(65) Prior Publication Data

US 2023/0050959 A1  Feb. 16, 2023

(51) Int. Cl.
*H04W 36/00* (2009.01)

(52) U.S. Cl.
CPC .............. *H04W 36/0066* (2013.01); *H04W 36/0033* (2013.01)

(58) Field of Classification Search
CPC ... H04W 36/0069; H04W 36/08; H04W 36/32; H04W 36/0061; H04W 36/0066; H04W 40/36; H04W 36/0033; H04W 36/00837; H04W 36/14
See application file for complete search history.

(56) References Cited

U.S. PATENT DOCUMENTS

| | | | | |
|---|---|---|---|---|
| 2021/0022047 A1* | 1/2021 | Zong et al. | ........... | H04W 40/36 |
| 2021/0029597 A1* | 1/2021 | Xu et al. | ............. | H04W 36/08 |
| 2021/0235334 A1* | 7/2021 | Purkayastha et al. | ...................... | H04W 28/0819 |
| 2021/0337441 A1* | 10/2021 | Zhang et al. | ..... | H04W 36/0069 |
| 2021/0385704 A1* | 12/2021 | Mayer et al. | ........ | H04L 1/1642 |
| 2022/0014989 A1* | 1/2022 | Zhang | .................. | H04W 36/38 |

FOREIGN PATENT DOCUMENTS

WO       2020030676 A1 *  2/2020 .............. H04W 36/125

\* cited by examiner

*Primary Examiner* — Allahyar Kasraian
(74) *Attorney, Agent, or Firm* — Harrity & Harrity, LLP; Dang M. Vo

(57) ABSTRACT

Various aspects of the present disclosure generally relate to wireless communication. In some aspects, a source master eNodeB (MeNB) may transmit, to a target Next Generation radio access network (NG-RAN) node, a handover required message to initiate an inter-system handover from an evolved-Universal Mobile Telecommunications System (UMTS) terrestrial radio access network (E-UTRAN) New Radio (NR) dual connectivity (EN-DC) system associated with the source MeNB to an NR standalone (SA) system associated with the target NG-RAN node. The source MeNB may have an indirect path to the target NG-RAN node and a source secondary gNodeB (SgNB) may have a direct path to the target NG-RAN node. The source MeNB may transmit, to the target NG-RAN node and based at least in part on the handover required message, forwarded data via the indirect path between the source MeNB and the target NG-RAN node through a core network. Numerous other aspects are described.

30 Claims, 8 Drawing Sheets

DATA FORWARDING DURING INTER-SYSTEM HANDOVERS

FIELD OF THE DISCLOSURE

Aspects of the present disclosure generally relate to wireless communication and to techniques and apparatuses for data forwarding during inter-system handovers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a source master eNodeB (MeNB) includes a memory and one or more processors, coupled to the memory, configured to: transmit, to a target Next Generation radio access network (NG-RAN) node, a handover required message to initiate an inter-system handover from an evolved-Universal Mobile Telecommunications System (UMTS) terrestrial radio access network (E-UTRAN) New Radio (NR) dual connectivity (EN-DC) system associated with the source MeNB to an NR standalone (SA) system associated with the target NG-RAN node, the source MeNB having an indirect path to the target NG-RAN node and a source secondary gNodeB (SgNB) having a direct path to the target NG-RAN node; transmit, to the target NG-RAN node and based at least in part on the handover required message, forwarded data via the indirect path between the source MeNB and the target NG-RAN node through a core network, the indirect path being configured for indirect data forwarding for master node (MN) terminated bearers; and receive, from a network entity, addresses for direct data forwarding for secondary node (SN) terminated bearers.

In some implementations, an apparatus for wireless communication at a source NG-RAN node includes a memory and one or more processors, coupled to the memory, configured to: transmit, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB; transmit, to the target MeNB and based at least in part on the handover required message, forwarded data via the indirect path between the source NG-RAN node and the target MeNB through a core network, the indirect path being configured for indirect data forwarding for MN terminated bearers; and receive, from the network entity, addresses for direct data forwarding of the forwarded data for SN terminated bearers.

In some implementations, a method of wireless communication performed by a source MeNB includes transmitting, to a target NG-RAN node, a handover required message to initiate an inter-system handover from an EN-DC system associated with the source MeNB to an NR SA system associated with the target NG-RAN node, the source MeNB having an indirect path to the target NG-RAN node and a source SgNB having a direct path to the target NG-RAN node; transmitting, to the target NG-RAN node and based at least in part on the handover required message, forwarded data via the indirect path between the source MeNB and the target NG-RAN node through a core network, the indirect path being configured for indirect data forwarding for MN terminated bearers; and receiving, from a network entity, addresses for direct data forwarding for SN terminated bearers.

In some implementations, a method of wireless communication performed by a source NG-RAN node includes transmitting, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB; transmitting, to the target MeNB and based at least in part on the handover required message, forwarded data via the indirect path between the source NG-RAN node and the target MeNB through a core network, the indirect path being configured for indirect data forwarding for MN terminated bearers; and receiving, from the network entity, addresses for direct data forwarding of the forwarded data for SN terminated bearers.

In some implementations, a non-transitory computer-readable medium storing a set of instructions for wireless communication includes one or more instructions that, when executed by one or more processors of a source MeNB, cause the source MeNB to: transmit, to a target NG-RAN node, a handover required message to initiate an inter-system handover from an EN-DC system associated with the source MeNB to an NR SA system associated with the target NG-RAN node, the source MeNB having an indirect path to the target NG-RAN node and a source SgNB having a direct path to the target NG-RAN node; transmit, to the target NG-RAN node and based at least in part on the handover required message, forwarded data via the indirect path between the source MeNB and the target NG-RAN node through a core network, the indirect path being configured for indirect data forwarding for MN terminated bearers; and receive, from a network entity, addresses for direct data forwarding for SN terminated bearers.

In some implementations, a non-transitory computer-readable medium storing a set of instructions for wireless communication includes one or more instructions that, when executed by one or more processors of a source NG-RAN node, cause the source NG-RAN node to: transmit, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB; transmit, to the target MeNB and based at least in part on the handover required message, forwarded data via the indirect path between the source NG-RAN node and the target MeNB through a core network, the indirect path being configured for indirect data forwarding for MN terminated bearers; and receive, from the network entity, addresses for direct data forwarding of the forwarded data for SN terminated bearers.

In some implementations, an apparatus for wireless communication includes means for transmitting, to a target NG-RAN node, a handover required message to initiate an inter-system handover from an EN-DC system associated with the apparatus to an NR SA system associated with the target NG-RAN node, the apparatus having an indirect path to the target NG-RAN node and a source SgNB having a direct path to the target NG-RAN node; means for transmitting, to the target NG-RAN node and based at least in part on the handover required message, forwarded data via the indirect path between the apparatus and the target NG-RAN node through a core network, the indirect path being configured for indirect data forwarding for MN terminated bearers; and means for receiving, from a network entity, addresses for direct data forwarding for SN terminated bearers.

In some implementations, an apparatus for wireless communication includes means for transmitting, to a network entity, a handover required message to initiate an inter-system handover from an NR SA system associated with the apparatus to an EN-DC system associated with a target MeNB, the apparatus having an indirect path to the target MeNB and the apparatus having a direct path to a target SgNB; means for transmitting, to the target MeNB and based at least in part on the handover required message, forwarded data via the indirect path between the apparatus and the target MeNB through a core network, the indirect path being configured for indirect data forwarding for MN terminated bearers; and means for receiving, from the network entity, addresses for direct data forwarding of the forwarded data for SN terminated bearers.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
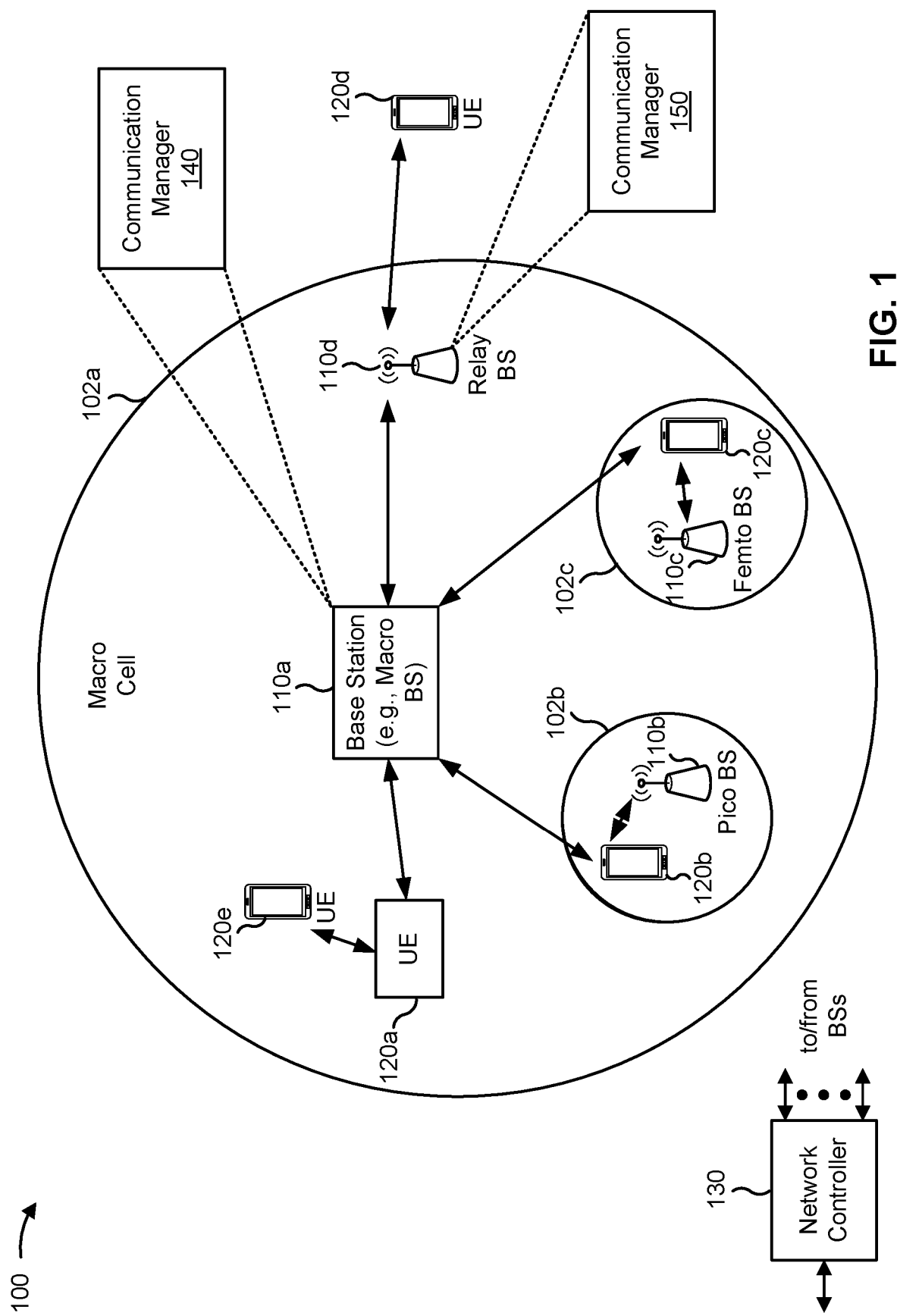
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP).

Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz - 7.125 GHz) and FR2 (24.25 GHz - 52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz - 300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz - 24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz - 71 GHz), FR4 (52.6 GHz - 114.25 GHz), and FR5 (114.25 GHz - 300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a source master eNodeB (MeNB) (e.g., base station 110a) may include a communication manager 140. As described in more detail elsewhere herein, the communication manager 140 may transmit, to a target Next Generation radio access network (NG-RAN) node, a handover required message to initiate an inter-system handover from an evolved-UMTS terrestrial radio access network (E-UTRAN) New Radio dual connectivity (EN-DC) system associated with the source MeNB to an NR standalone (SA) system associated with the target NG-RAN node, the source MeNB having an indirect path to the target NG-RAN node and a source secondary gNodeB (SgNB) having a direct path to the target NG-RAN node; transmit, to the target NG-RAN node and based at least in part on the handover required message, forwarded data via the indirect path between the source MeNB and the target NG-RAN node through a core network, the indirect path being configured for indirect data forwarding for master node (MN) terminated bearers; and receive, from a network entity, addresses for direct data forwarding for secondary node (SN) terminated bearers. Additionally, or alternatively, the communication manager 140 may perform one or more other operations described herein.

In some aspects, a source Next Generation radio access network (NG-RAN) node (e.g., base station 110d) may include a communication manager 150. As described in more detail elsewhere herein, the communication manager 150 may transmit, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB; transmit, to the target MeNB and based at least in part on the handover required message, forwarded data via the indirect path between the source NG-RAN node and the target MeNB through a core network, the indirect path being configured for indirect data forwarding for MN terminated bearers; and receive, from the network entity, addresses for direct data forwarding of the forwarded data for SN terminated bearers. Additionally, or alternatively, the communication manager 150 may perform one or more other operations described herein.

As indicated above, FIG. 1 is provided as an example. Other examples may differ from what is described with regard to FIG. 1.

Figure 2:
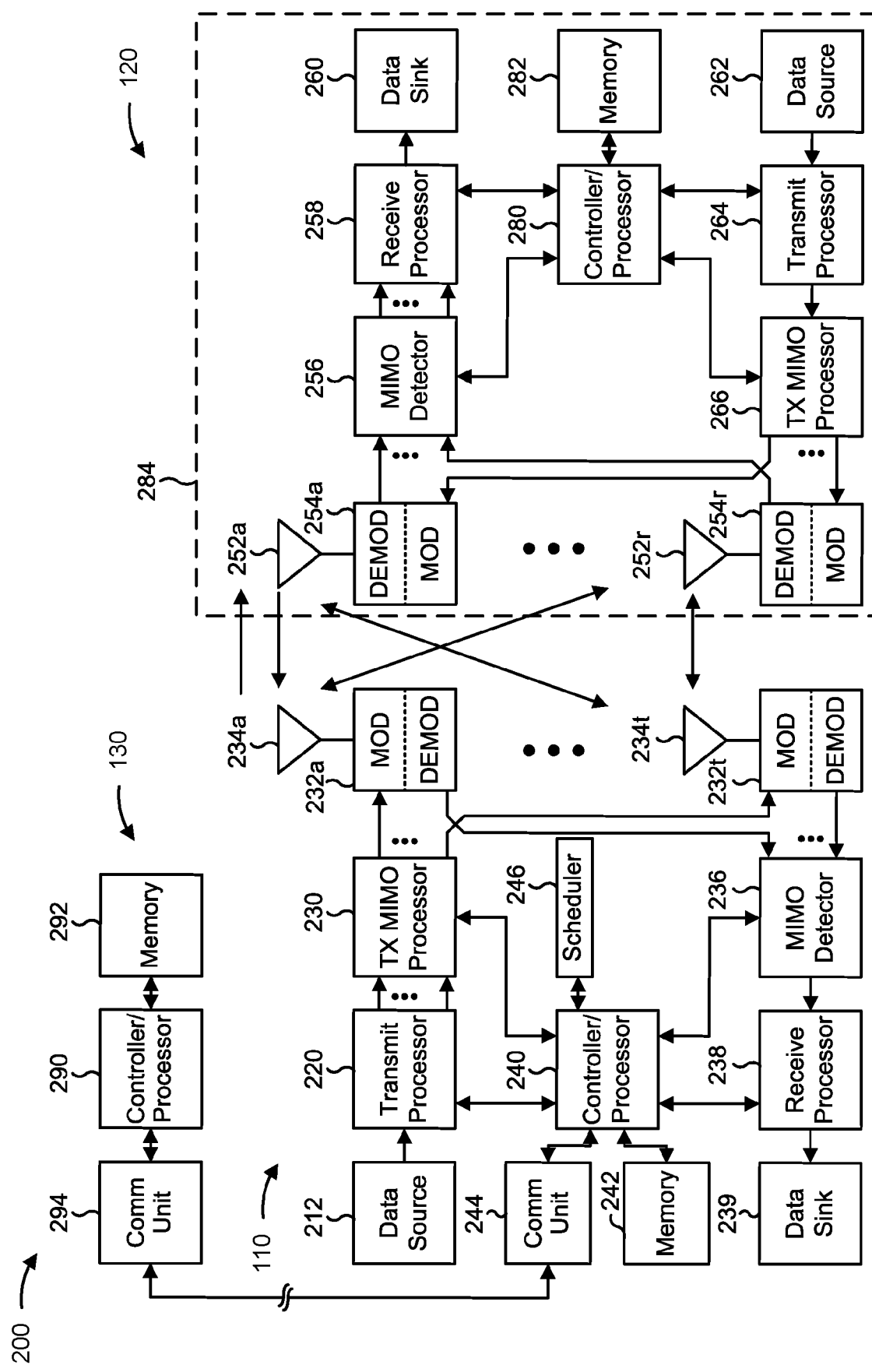
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T ≥ 1). The UE 120 may be equipped with a set of antennas 252a through 252r, such as R antennas (R ≥ 1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with data forwarding during inter-system handovers, as described in more detail elsewhere herein. In some aspects, the source MeNB described herein is the base station 110, is included in the base station 110, or includes one or more components of the base station 110 shown in FIG. 2. In some aspects, the source NG-RAN node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a source master eNodeB (MeNB) (e.g., base station 110a) includes means for transmitting, to a target Next Generation radio access network (NG-RAN) node, a handover required message to initiate an inter-system handover from an evolved-UMTS terrestrial radio access network (E-UTRAN) New Radio dual connectivity (EN-DC) system associated with the source MeNB to an NR standalone (SA) system associated with the target NG-RAN node, the source MeNB having an indirect path to the target NG-RAN node and a source secondary gNodeB (SgNB) having a direct path to the target NG-RAN node; means for transmitting, to the target NG-RAN node and based at least in part on the handover required message, forwarded data via the indirect path between the source MeNB and the target NG-RAN node through a core network, the indirect path being configured for indirect data forwarding for master node (MN) terminated bearers; and/or means for receiving, from a network entity, addresses for direct data forwarding for secondary node (SN) terminated bearers. In some aspects, the means for the source MeNB to perform operations described herein may include, for example, one or more of transmit processor 220, TX MIMO processor 230, modem 232, antenna 234, MIMO detector 236, receive processor 238, controller/processor 240, memory 242, or scheduler 246.

In some aspects, a source Next Generation radio access network (NG-RAN) node (e.g., base station 110d) includes means for transmitting, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB; means for transmitting, to the target MeNB and based at least in part on the handover required message, forwarded data via the indirect path between the source NG-RAN node and the target MeNB through a core network, the indirect path being configured for indirect data forwarding for MN terminated bearers; and/or means for receiving, from the network entity, addresses for direct data forwarding of the forwarded data for SN terminated bearers. In some aspects, the means for the source NG-RAN node to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE may be handed over from an SA system, such as an NR SA system, to a multi-RAT dual connectivity (MR-DC) system, such as an EN-DC system. The handover between the SA system and the MR-DC system may be an inter-system handover. During the inter-system handover, data may be forwarded between the SA system and the MR-DC system. For example, packets that the UE could not receive from a source node associated with the SA system before the inter-system handover may be forwarded from the source node to a target node associated with the MR-DC system. As another example, the UE may receive some packets from the source node before the inter-system handover but other packets may not be received before the inter-system handover, so out-of-sequence packets may be forwarded from the source node to the target node.

In some cases, during the inter-system handover from the EN-DC system to an NR SA system, data may need to be forwarded from the EN-DC system to the NR SA system. A source MeNB associated with the EN-DC system may not have a direct path to a target NG-RAN node associated with the NR SA system. A source SgNB associated with the EN-DC system may have a direct path to the target NG-RAN node. However, the source MeNB may not be configured perform data forwarding without the direct path to the target NG-RAN node. Further, during an inter-system handover from the NR SA system to the EN-DC system, data may need to be forwarded from the NR SA system to the EN-DC system. A source NG-RAN node associated with the NR SA system may not have a direct path to a target MeNB associated with the EN-DC system. The source NG-RAN node may have a direct path to a target SgNB associated with the EN-DC system. However, the source NG-RAN node may not be configured to perform data forwarding without the direct path to the target MeNB.

In various aspects of techniques and apparatuses described herein, for the inter-system handover from the EN-DC system to the NR SA system, the source MeNB may transmit, to the target NG-RAN node, forwarded data via an indirect path between the source MeNB and the target NG-RAN node through a core network. The indirect path may be configured for indirect data forwarding for MN terminated bearers. The source MeNB may receive, from a network entity, addresses for direct data forwarding for SN terminated bearers. As a result, the source MeNB may transmit the forwarded data, even without the direct path to the target NG-RAN node. Further, for the inter-system handover from the NR SA system to the EN-DC system, the source NG-RAN node may transmit, to the target MeNB, forwarded data via an indirect path between the source NG-RAN node and the target MeNB through the core network. The indirect path may be configured for indirect data forwarding for the MN terminated bearers. The source NG-RAN node may receive, from the network entity, addresses for direct data forwarding of the forwarded data for the SN terminated bearers. As a result, the source NG-RAN node may transmit the forwarded data, even without the direct path to the target MeNB.

Figure 3:
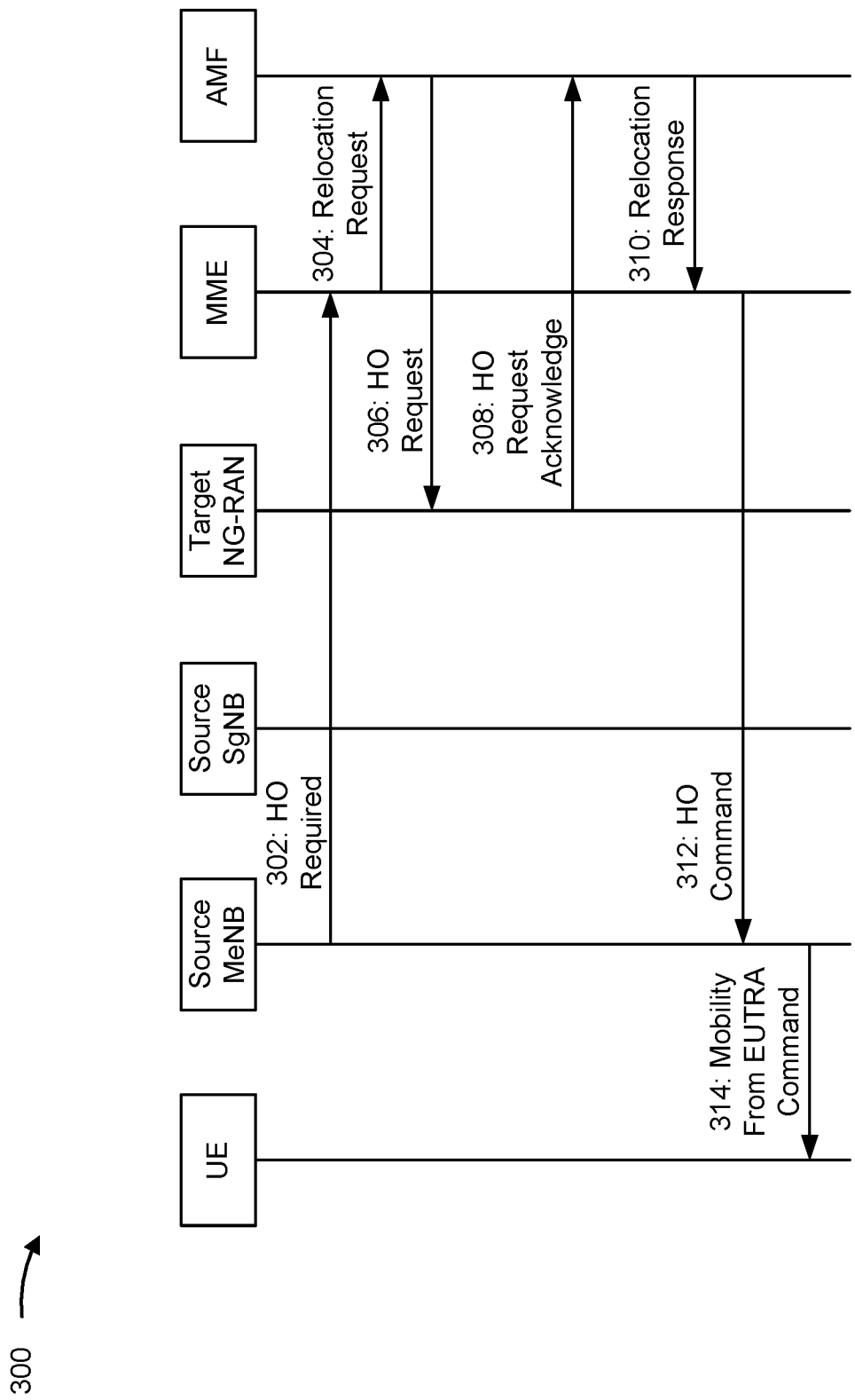
FIG. 3 is a diagram illustrating an example associated with an inter-system handover between a multi-radio access technology (multi-RAT) dual connectivity (MR-DC) system and a New Radio (NR) standalone (SA) system, in accordance with the present disclosure.

FIG. 3 is a diagram illustrating an example 400 of an inter-system handover between an MR-DC system and an NR SA system and an MR-DC system, in accordance with the present disclosure. The MR-DC system may be an EN-DC system.

As shown by reference number 302, during the inter-system handover between the EN-DC system and the NR SA system, a source MeNB may transmit a handover (HO) required message to a mobility management entity (MME). As shown by reference number 304, the MME may transmit a relocation request to an access and mobility management function (AMF). As shown by reference number 306, the AMF may transmit a handover request to a target NG-RAN node. As shown by reference number 308, the target NG-RAN node may transmit, to the AMF, a handover request acknowledge message. As shown by reference number 310, the AMF may transmit a relocation response to the MME. As shown by reference number 312, the MME may transmit a handover command to the source MeNB. As shown by reference number 314, the source MeNB may transmit a mobility from evolved-UMTS terrestrial radio access (EUTRA) command to a UE. After receiving the mobility from EUTRA command from the source MeNB, the UE may be handed over from the EN-DC system to the NR SA system.

In some aspects, during the inter-system handover from the EN-DC system to the NR SA system, the source MeNB associated with the EN-DC system may not have a direct path to the target NG-RAN node associated with the NR SA system, but a source SgNB associated with the EN-DC system may have a direct path to the target NG-RAN node. The source MeNB may store information (e.g., based at least in part on received signaling) that indicates that the source SgNB has the direct path to the target NG-RAN node.

After an initiation of the inter-system handover from the EN-DC system to the NR SA system, the source MeNB may transmit the handover required message to the MME that stores UE context information. The handover required message may or may not include a direct forwarding path availability information element (IE), which may have an effect on data forwarding.

In some aspects, the handover required message transmitted by the source MeNB may not include the direct forwarding path availability IE, which may indicate that the source MeNB does not have a direct forwarding path to the target NG-RAN node. During the inter-system handover, an indirect path through a core network may be configured for data forwarding from the source MeNB to the target NG-RAN node for MN terminated bearers. The handover required message may not include the direct forwarding path availability UE to indicate that the source MeNB has the indirect path to the target NG-RAN node. For SN terminated bearers, to take advantage of the direct path between the source SgNB and the target NG-RAN node, the handover required message may include a source-to-target container that indicates a direct forwarding path availability from the source SgNB. In other words, the handover required message transmitted by the source MeNB may include the source-to-target container, which may indicate that the source SgNB has the direct forwarding path to the target NG-RAN node. The target NG-RAN node may transmit a handover request acknowledge message that includes a target-to-source container, where the target-to-source container may indicate addresses for direct forwarding for the SN terminated bearers.

In some aspects, during the inter-system handover, the indirect path through the core network may be configured for the data forwarding from the source MeNB to the target NG-RAN node for the MN terminated bearers admitted in the inter-system handover. Addresses for indirect data forwarding may be provided to the source MeNB in the handover command message. In other words, the source MeNB may receive the handover command message from the MME, which may indicate the addresses for the indirect data forwarding for the MN terminated bearers, which may enable data to be forwarded from the source MeNB to the target NG-RAN node via the indirect path through the core network.

In some aspects, the source MeNB may transmit, to the target NG-RAN node, the handover required message to initiate the inter-system handover from the EN-DC system associated with the source MeNB to the NR SA system associated with the target NG-RAN node. The source MeNB may have an indirect path to the target NG-RAN node and the source SgNB may have a direct path to the target NG-RAN node. The source MeNB may transmit, to the target NG-RAN node and based at least in part on the handover required message, forwarded data via the indirect path between the source MeNB and the target NG-RAN node through a core network. The indirect path may be configured for the indirect data forwarding for MN terminated bearers. Further, the source MeNB may receive, from a network entity, addresses for direct data forwarding for SN terminated bearers.

In some aspects, the source MeNB may indicate a direct forwarding path availability from the source SgNB to the target NG-RAN node in the source-to-target container of the handover required message. The target NG-RAN node may read contents of the source-to-target container of the handover required message. In some aspects, the target NG-RAN node may include addresses for the direct forwarding for the SN terminated bearers admitted in the inter-system handover. The target NG-RAN node may include the addresses in the target-to-source container of the handover request acknowledgement message. These addresses may be provided to the source MeNB in a target-to-source container of the handover command message.

In some aspects, the handover required message may include the source-to-target container that indicates the direct path between the source SgNB and the target NG-RAN node for the direct data forwarding for the SN terminated bearers. The source MeNB may receive, from the network entity, the handover command message that includes the target-to-source container that indicates the addresses for the direct data forwarding for the SN terminated bearers, where the addresses for the direct data forwarding for the SN terminated bearers may be indicated in the target-to-source container of the handover request acknowledge message transmitted by the target NG-RAN node.

In some aspects, the source MeNB may forward a message, to the source SgNB, that indicates the addresses for the SN terminated bearers included in the handover command message. The source MeNB may read contents of the target-to-source container of the handover command message in order to identify the addresses for the SN terminated bearers. The source MeNB may transmit, to the source SgNB, the message that indicates the addresses for the direct data forwarding for the SN terminated bearers, as indicated in the handover command message.

In some aspects, data forwarding for the MN terminated bearers may involve the source MeNB transmitting data to the source SgNB via a direct forwarding, and the source SgNB may forward the data received from the source MeNB to the target NG-RAN node. In some aspects, data forwarding for the SN terminated bearers may involve the source SgNB forwarding data via a direct forwarding to the target NG-RAN node. The addresses for indirect data forwarding provided in the handover command message may be ignored by the source MeNB.

In some aspects, for the data forwarding for the MN terminated bearers and the data forwarding for the SN terminated bearers, during the inter-system handover, the indirect path through the core network may be configured for the data forwarding from the source MeNB to the target NG-RAN node for the MN terminated bearers admitted in the inter-system handover. The addresses for the data forwarding may be provided to the source MeNB in the handover command message. The source MeNB may indicate the direct forwarding path availability from the source SgNB to the target NG-RAN node in the source-to-target container of the handover required message. The target NG-RAN node may read contents of the source-to-target container of the handover required message.

In some aspects, the source MeNB may ignore the addresses for the indirect data forwarding provided in the handover command message for the MN terminated bearers admitted in the inter-system handover. In some aspects, the target NG-RAN node may include addresses for direct forwarding for a plurality of data bearers (e.g., all data bearers) admitted in the inter-system handover in the target-to-source container of the handover request acknowledge message, and these addresses may be provided in the source-to-target container of the handover command message.

In some aspects, the source MeNB may receive, from the network entity, the handover command message that indicates addresses for the indirect data forwarding for the MN terminated bearers. The MeNB may ignore the addresses for the indirect data forwarding for the MN terminated bearers, as indicated in the handover command message, based at least in part on the forwarded data being transmitted from the source MeNB to the target NG-RAN node via the source SgNB for the MN terminated bearers. In some aspects, the source MeNB may receive, from the network entity, the handover command message that includes the target-to-source container that indicates the addresses for the direct data forwarding for the plurality of data bearers associated with the inter-system handover. The plurality of data bearers may include the MN terminated bearers and the SN terminated bearers. The addresses for the direct data forwarding for the plurality of data bearers may be indicated in the target-to-source container of the handover request acknowledge message transmitted by the target NG-RAN node.

In some aspects, the source MeNB may forward a message, to the source SgNB, that indicates the addresses for the plurality of data bearers (e.g., all data bearers) indicated in the handover command message. The source SgNB may forward data for the MN terminated bearers from the source MeNB to the target NG-RAN node. The source SgNB may provide a message to the source MeNB that indicates addresses associated with the source SgNB, where the addresses may enable the source SgNB to forward the data from the source MeNB to the target NG-RAN node.

In some aspects, the source MeNB may transmit, to the source SgNB, the message that indicates the addresses for the direct data forwarding for the plurality of data bearers, as indicated in the handover command message. The source MeNB may receive, from the source SgNB, the message that indicates the addresses associated with the source SgNB, where the forwarded data for the MN terminated bearers may be provided from the source MeNB to the source SgNB based at least in part on the addresses associated with the source SgNB. The forwarded data may be provided by the source SgNB to the target NG-RAN node based at least in part on the addresses for the direct data forwarding for the plurality of data bearers, as indicated in the handover command message.

In some aspects, an actual data forwarding may depend on an implementation. For example, tunnels may be established from the source MeNB to the source SgNB on an X2 interface, and data forwarding may be performed via the tunnels established between the source MeNB and the source SgNB.

In some aspects, the handover required message transmitted by the source MeNB may include the direct forwarding path availability IE, which may be an extension of the use of the direct forwarding path availability IE to the case when a source configuration is associated with an MR-DC system. The handover required message may include the direct forwarding path availability IE to indicate that either the source MeNB or the source SgNB has the direct path to the target NG-RAN node.

In some aspects, the target NG-RAN node may indicate addresses for direct forwarding for a plurality of data bearers (e.g., all data bearers) admitted in the inter-system handover using an existing IE in the handover request acknowledge message, such as an IE associated with a data forwarding response E-UTRAN Radio Access Bearer (E-RAB) list. These addresses may be provided to the source MeNB using an existing IE in the handover command message, such as an IE associated with a data forwarding response E-RAB list. The source MeNB may receive, from the network entity, the handover command message that indicates the addresses for direct data forwarding for the plurality of data bearers associated with the inter-system handover, where the plurality of data bearers may include the MN terminated bearers and the SN terminated bearers. The addresses for the direct data forwarding for the plurality of data bearers may be indicated in the handover request acknowledge message transmitted by the target NG-RAN node.

In some aspects, prior to the inter-system handover, an MN may configure bearers associated with the MN to be SN terminated via an SN modification procedure. An SN modification request may include an indication that configuring the bearers to be SN terminated is for data forwarding only and that a Uu interface change is not needed. After transmitting the SN modification request, the MN may initiate an inter-system handover procedure and include a data forwarding path availability IE in the handover required message. In some aspects, the source MeNB may configure, prior to the inter-system handover, the plurality of bearers associated with the source MeNB to be the SN terminated bearers for data forwarding purposes, where the handover required message may indicate the direct forwarding path availability IE to indicate that the source SgNB has the direct path to the target NG-RAN node.

As indicated above, FIG. 3 is provided as an example. Other examples may differ from what is described with regard to FIG. 3.

Figure 4:
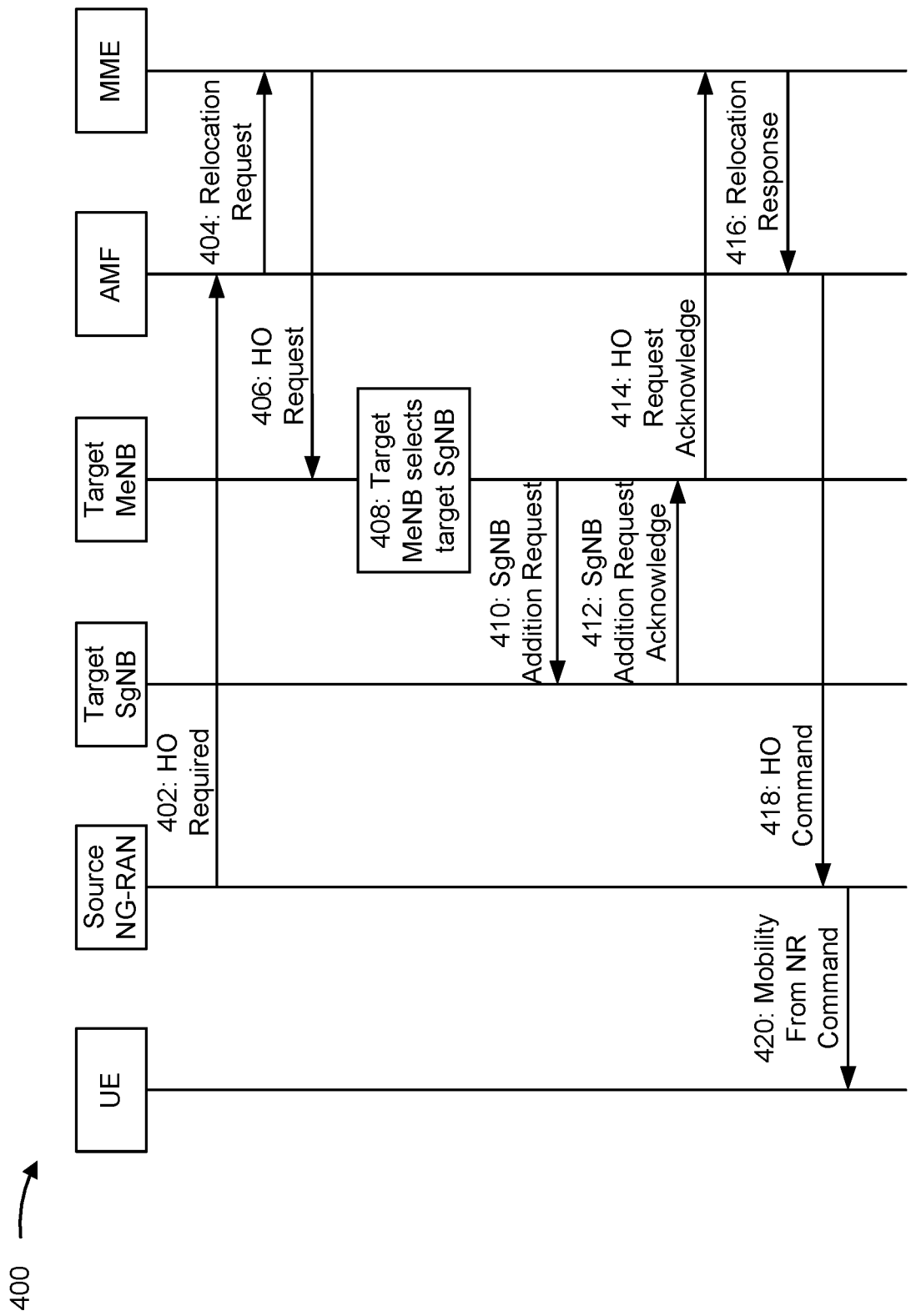
FIG. 4 is a diagram illustrating an example associated with an inter-system handover between an NR SA system and an MR-DC system, in accordance with the present disclosure.

FIG. 4 is a diagram illustrating an example 400 of an inter-system handover between an NR SA system and an MR-DC system, in accordance with the present disclosure. The MR-DC system may be an EN-DC system.

As shown by reference number 402, during the inter-system handover between the NR SA system and the EN-DC system, a source NG-RAN node may transmit a handover (HO) required message to an access and mobility management function (AMF). As shown by reference number 404, the AMF may transmit a relocation request to a mobility management entity (MME). As shown by reference number 406, the MME may transmit a handover request to a target MeNB. As shown by reference number 408, the target MeNB may select a target SgNB. As shown by reference number 410, the target MeNB may transmit an SgNB addition request to the target SgNB. As shown by reference number 412, the target SgNB may transmit, to the target MeNB, an SgNB addition request acknowledge message. As shown by reference number 414, the target MeNB may transmit, to the MME, a handover request acknowledge message. As shown by reference number 416, the MME may transmit a relocation response to the AMF. As shown by reference number 418, the AMF may transmit a handover command to the source NG-RAN node. As shown by reference number 420, the source NG-RAN node may transmit a mobility from NR command to a UE. After receiving the mobility from NR command from the NG-RAN node, the UE may be handed over from the NR SA system to the EN-DC system.

In some aspects, during the inter-system handover from the NR SA system to the EN-DC system, the source NG-RAN node associated with the NR SA system may not have a direct path to the target MeNB associated with the EN-DC system, but the source NG-RAN node may have a direct path to the target SgNB. The target MeNB may store information (e.g., based at least in part on received signaling) that indicates that the target SgNB has the direct path to the source NG-RAN node.

In some aspects, the handover required message transmitted by the source NG-RAN node may not include the direct forwarding path availability IE, which may indicate that the source NG-RAN node does not have a direct forwarding path to the target MeNB. In some aspects, for MN terminated bearers, an indirect data forwarding path through a core network may be configured during the inter-system handover, and addresses for data forwarding may be provided to the source NG-RAN node in the handover command message. The target SgNB may include addresses for direct forwarding of SN terminated bearers in an SN addition request acknowledge message. The target MeNB may include the addresses associated with the SN terminated bearers in a target-to-source container of the handover request acknowledge message, and these addresses may be provided to the source NG-RAN node in a target-to-source container of the handover command message.

In some aspects, the source NG-RAN node may transmit, to a network entity, the handover required message to initiate the inter-system handover from the NR SA system associated with the source NG-RAN node to the EN-DC system associated with the target MeNB. The source NG-RAN node may have an indirect path to the target MeNB and the source NG-RAN node may have the direct path to the target SgNB. The source NG-RAN node may transmit, to the target MeNB and based at least in part on the handover required message, forwarded data via the indirect path between the source NG-RAN node and the target MeNB through a core network. The indirect path may be configured for indirect data forwarding for the MN terminated bearers. The source NG-RAN node may receive, from the network entity, the addresses for the direct data forwarding of the forwarded data for the SN terminated bearers.

In some aspects, the handover required message may not include the direct forwarding path availability IE to indicate that the source NG-RAN node has the indirect path to the target MeNB. The source NG-RAN node may receive, from the network entity, the handover command message that indicates the addresses for the indirect data forwarding for the MN terminated bearers. The source NG-RAN node may receive, from the network entity, the handover command message that includes the target-to-source container that indicates the addresses for the direct data forwarding for the SN terminated bearers, where the addresses for the direct data forwarding for the SN terminated bearers may be indicated in the target-to-source container of the handover request acknowledge message transmitted by the target MeNB. The target SgNB may indicate the addresses for the direct data forwarding of the SN terminated bearers in the SN addition request acknowledge message transmitted to the target MeNB.

In some aspects, addresses for the indirect data forwarding provided in the handover command message may be ignored by the source NG-RAN node. For the MN terminated bearers, the indirect data forwarding path through the core network may be configured during the inter-system handover, and the addresses for data forwarding may be provided to the source NG-RAN node in the handover command message. In some aspects, the source NG-RAN node may ignore the addresses for the indirect data forwarding provided in the handover command message for the MN terminated bearers admitted in the inter-system handover.

In some aspects, the source NG-RAN node may receive, from the network entity, the handover command message that indicates the addresses for the indirect data forwarding for the MN terminated bearers. The source NG-RAN node may ignore the addresses for the indirect data forwarding for the MN terminated bearers, as indicated in the handover command message, based at least in part on the forwarded data being transmitted from the source NG-RAN node to the target MeNB via the target SgNB for the MN terminated bearers.

In some aspects, the target MeNB may indicate addresses associated with the target MeNB for data forwarding of MN terminated bearers admitted in the inter-system handover. The target MeNB may indicate the addresses in the SgNB addition request message. In some aspects, the target SgNB may indicate addresses for direct data forwarding of a plurality of bearers (e.g., all bearers) admitted in the inter-system handover. The target SgNB may indicate the addresses in the SgNB addition request acknowledge message.

In some aspects, the SgNB addition request message transmitted from the target MeNB to the target SgNB may indicate the addresses associated with the target MeNB. The forwarded data for the MN terminated bearers may be provided from the source NG-RAN node to the target MeNB based at least in part on the addresses associated with the target MeNB. In some aspects, the SgNB addition request acknowledge message transmitted from the target SgNB to the target MeNB may indicate the addresses for the direct data forwarding for the plurality of data bearers associated with the inter-system handover, where the plurality of data bearers may include the MN terminated bearers and the SN terminated bearers.

In some aspects, the target MeNB may indicate the addresses for the direct data forwarding of the plurality of bearers (e.g., all bearers) provided in the SgNB addition request acknowledgement message in a target-to-source container of the handover request acknowledge message, and these addresses may be indicated in a target-to-source container of the handover command message to the source NG-RAN. In some aspects, the target SgNB may forward data for the MN terminated bearers from the source NG-RAN node to the target MeNB.

In some aspects, the source NG-RAN node may receive, from the network entity, the handover command message that includes the target-to-source container that indicates the addresses for the direct data forwarding for the plurality of data bearers associated with the inter-system handover, where the plurality of data bearers may include the MN terminated bearers and the SN terminated bearers. The addresses for the direct data forwarding for the plurality of data bearers may be indicated in the target-to-source container of the handover request acknowledge message transmitted by the target MeNB. The forwarded data for the MN terminated bearers may be provided by the target SgNB to the target MeNB based at least in part on the addresses for the direct data forwarding, as indicated in the SgNB addition request message.

As indicated above, FIG. 4 is provided as an example. Other examples may differ from what is described with regard to FIG. 4.

Figure 5:
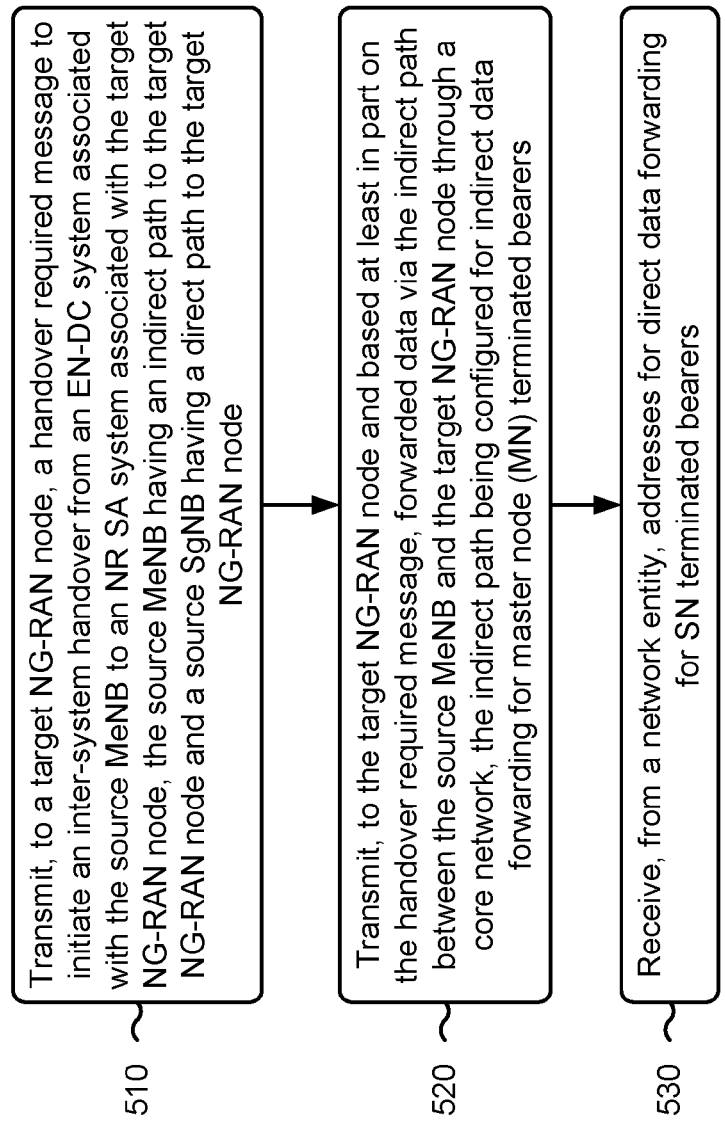
FIGS. 5-6 are diagrams illustrating example processes associated with data forwarding during inter-system handovers, in accordance with the present disclosure.

FIG. 5 is a diagram illustrating an example process 500 performed, for example, by a source MeNB, in accordance with the present disclosure. Example process 500 is an example where the source MeNB (e.g., base station 110a) performs operations associated with data forwarding during inter-system handovers.

As shown in FIG. 5, in some aspects, process 500 may include transmitting, to a target NG-RAN node, a handover required message to initiate an inter-system handover from an EN-DC system associated with the source MeNB to an NR SA system associated with the target NG-RAN node, the source MeNB having an indirect path to the target NG-RAN node and a source SgNB having a direct path to the target NG-RAN node (block 510). For example, the source MeNB (e.g., using transmission component 704, depicted in FIG. 7) may transmit, to a target NG-RAN node, a handover required message to initiate an inter-system handover from an EN-DC system associated with the source MeNB to an NR SA system associated with the target NG-RAN node, the source MeNB having an indirect path to the target NG-RAN node and a source SgNB having a direct path to the target NG-RAN node, as described above.

As further shown in FIG. 5, in some aspects, process 500 may include transmitting, to the target NG-RAN node and based at least in part on the handover required message, forwarded data via the indirect path between the source MeNB and the target NG-RAN node through a core network, the indirect path being configured for indirect data forwarding for MN terminated bearers (block 520). For example, the source MeNB (e.g., using transmission component 704, depicted in FIG. 7) may transmit, to the target NG-RAN node and based at least in part on the handover required message, forwarded data via the indirect path between the source MeNB and the target NG-RAN node through a core network, the indirect path being configured for indirect data forwarding for MN terminated bearers, as described above.

As further shown in FIG. 5, in some aspects, process 500 may include receiving, from a network entity, addresses for direct data forwarding for SN terminated bearers (block 530). For example, the source MeNB (e.g., using reception component 702, depicted in FIG. 7) may receive, from a network entity, addresses for direct data forwarding for SN terminated bearers, as described above.

Process 500 may include additional aspects, such as any single aspect or any combination of aspects described below and/or in connection with one or more other processes described elsewhere herein.

In a first aspect, the handover required message does not include a direct forwarding path availability information element to indicate that the source MeNB has the indirect path to the target NG-RAN node.

In a second aspect, alone or in combination with the first aspect, process 500 includes receiving, from the network entity, a handover command message that indicates addresses for the indirect data forwarding for the MN terminated bearers.

In a third aspect, alone or in combination with one or more of the first and second aspects, the handover required message includes a source-to-target container that indicates the direct path between the source SgNB and the target NG-RAN node for the direct data forwarding for the SN terminated bearers, and further comprising receiving, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target NG-RAN node.

In a fourth aspect, alone or in combination with one or more of the first through third aspects, process 500 includes transmitting, to the source SgNB, a message that indicates the addresses for the direct data forwarding for the SN terminated bearers, as indicated in the handover command message.

In a fifth aspect, alone or in combination with one or more of the first through fourth aspects, process 500 includes receiving, from the network entity, a handover command message that indicates addresses for the indirect data forwarding for the MN terminated bearers, and ignoring the addresses for the indirect data forwarding for the MN terminated bearers, as indicated in the handover command message, based at least in part on the forwarded data being transmitted from the source MeNB to the target NG-RAN node via the source SgNB for the MN terminated bearers.

In a sixth aspect, alone or in combination with one or more of the first through fifth aspects, process 500 includes receiving, from the network entity, a handover command message that includes a target-to-source container that indicates addresses for direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a target-to-source container of a handover request acknowledge message transmitted by the target NG-RAN node.

In a seventh aspect, alone or in combination with one or more of the first through sixth aspects, process 500 includes transmitting, to the source SgNB, a message that indicates the addresses for the direct data forwarding for the plurality of data bearers, as indicated in the handover command message, and receiving, from the source SgNB, a message that indicates addresses associated with the source SgNB, wherein the forwarded data for the MN terminated bearers is provided from the source MeNB to the source SgNB based at least in part on the addresses associated with the source SgNB, and the forwarded data is provided by the source SgNB to the target NG-RAN node based at least in part on the addresses for the direct data forwarding for the plurality of data bearers, as indicated in the handover command message.

In an eighth aspect, alone or in combination with one or more of the first through seventh aspects, the handover required message includes a direct forwarding path availability information element to indicate that either the source MeNB or the source SgNB has the direct path to the target NG-RAN node.

In a ninth aspect, alone or in combination with one or more of the first through eighth aspects, process 500 includes receiving, from the network entity, a handover command message that indicates addresses for direct data forwarding for a plurality of data bearers associated with the inter-system handover, wherein the plurality of data bearers include the MN terminated bearers and the SN terminated bearers, and the addresses for the direct data forwarding for the plurality of data bearers are indicated in a handover request acknowledge message transmitted by the target NG-RAN node.

In a tenth aspect, alone or in combination with one or more of the first through ninth aspects, process 500 includes configuring, prior to the inter-system handover, a plurality of bearers associated with the source MeNB to be the SN terminated bearers for data forwarding purposes, wherein the handover required message indicates a direct forwarding path availability information element to indicate that the source SgNB has the direct path to the target NG-RAN node.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
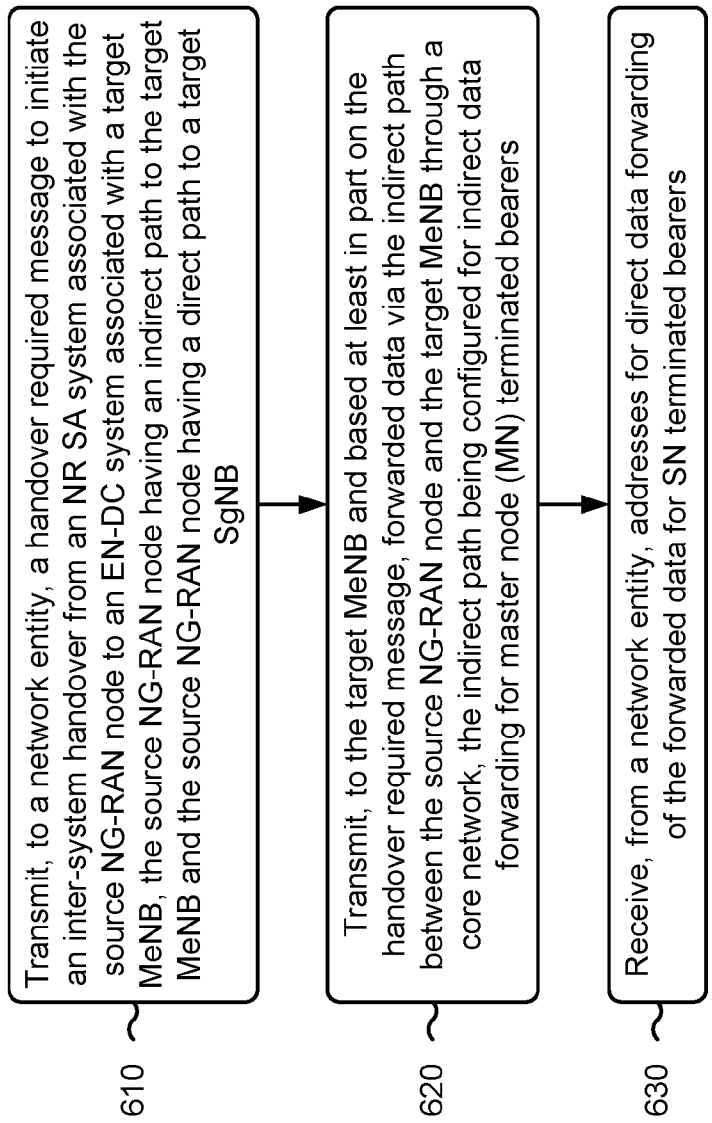

FIG. 6 is a diagram illustrating an example process 600 performed, for example, by a source NG-RAN node, in accordance with the present disclosure. Example process 600 is an example where the source NG-RAN node (e.g., base station 110*d*) performs operations associated with data forwarding during inter-system handovers.

As shown in FIG. 6, in some aspects, process 600 may include transmitting, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB (block 610). For example, the source NG-RAN node (e.g., using transmission component 804, depicted in FIG. 8) may transmit, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB, as described above.

As further shown in FIG. 6, in some aspects, process 600 may include transmitting, to the target MeNB and based at least in part on the handover required message, forwarded data via the indirect path between the source NG-RAN node and the target MeNB through a core network, the indirect path being configured for indirect data forwarding for MN terminated bearers (block 620). For example, the source NG-RAN node (e.g., using transmission component 804, depicted in FIG. 8) may transmit, to the target MeNB and based at least in part on the handover required message, forwarded data via the indirect path between the source NG-RAN node and the target MeNB through a core network, the indirect path being configured for indirect data forwarding for MN terminated bearers, as described above.

As further shown in FIG. 6, in some aspects, process 600 may include receiving, from the network entity, addresses for direct data forwarding of the forwarded data for SN terminated bearers (block 630). For example, the source NG-RAN node (e.g., using reception component 802, depicted in FIG. 8) may receive, from the network entity, addresses for direct data forwarding of the forwarded data for SN terminated bearers, as described above.

Process 600 may include additional aspects, such as any single aspect or any combination of aspects described below and/or in connection with one or more other processes described elsewhere herein.

In a first aspect, the handover required message does not include a direct forwarding path availability information element to indicate that the source NG-RAN node has the indirect path to the target MeNB.

In a second aspect, alone or in combination with the first aspect, process 600 includes receiving, from the network entity, a handover command message that indicates addresses for the indirect data forwarding for the MN terminated bearers.

In a third aspect, alone or in combination with one or more of the first and second aspects, process 600 includes receiving, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target MeNB, and the target SgNB indicates the addresses for the direct data forwarding of the SN terminated bearers in an SN addition request acknowledge message transmitted to the target MeNB.

In a fourth aspect, alone or in combination with one or more of the first through third aspects, process 600 includes receiving, from the network entity, a handover command message that indicates addresses for the indirect data forwarding for the MN terminated bearers, and ignoring the addresses for the indirect data forwarding for the MN terminated bearers, as indicated in the handover command message, based at least in part on the forwarded data being transmitted from the source NG-RAN node to the target MeNB via the target SgNB for the MN terminated bearers.

In a fifth aspect, alone or in combination with one or more of the first through fourth aspects, an SgNB addition request message transmitted from the target MeNB to the target SgNB indicates addresses associated with the target MeNB, wherein the forwarded data for the MN terminated bearers is provided from the source NG-RAN node to the target MeNB based at least in part on the addresses associated with the target MeNB.

In a sixth aspect, alone or in combination with one or more of the first through fifth aspects, an SgNB addition request acknowledge message transmitted from the target SgNB to the target MeNB indicates addresses for direct data forwarding for a plurality of data bearers associated with the inter-system handover, wherein the plurality of data bearers include the MN terminated bearers and the SN terminated bearers.

In a seventh aspect, alone or in combination with one or more of the first through sixth aspects, process 600 includes receiving, from the network entity, a handover command message that includes a target-to-source container that indicates addresses for the direct data forwarding for a plurality of data bearers associated with the inter-system handover, wherein the plurality of data bearers include the MN terminated bearers and the SN terminated bearers, and the addresses for the direct data forwarding for the plurality of data bearers are indicated in a target-to-source container of a handover request acknowledge message transmitted by the target MeNB.

In an eighth aspect, alone or in combination with one or more of the first through seventh aspects, the forwarded data for the MN terminated bearers is provided by the target SgNB to the target MeNB based at least in part on the addresses for the direct data forwarding, as indicated in an SgNB addition request message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
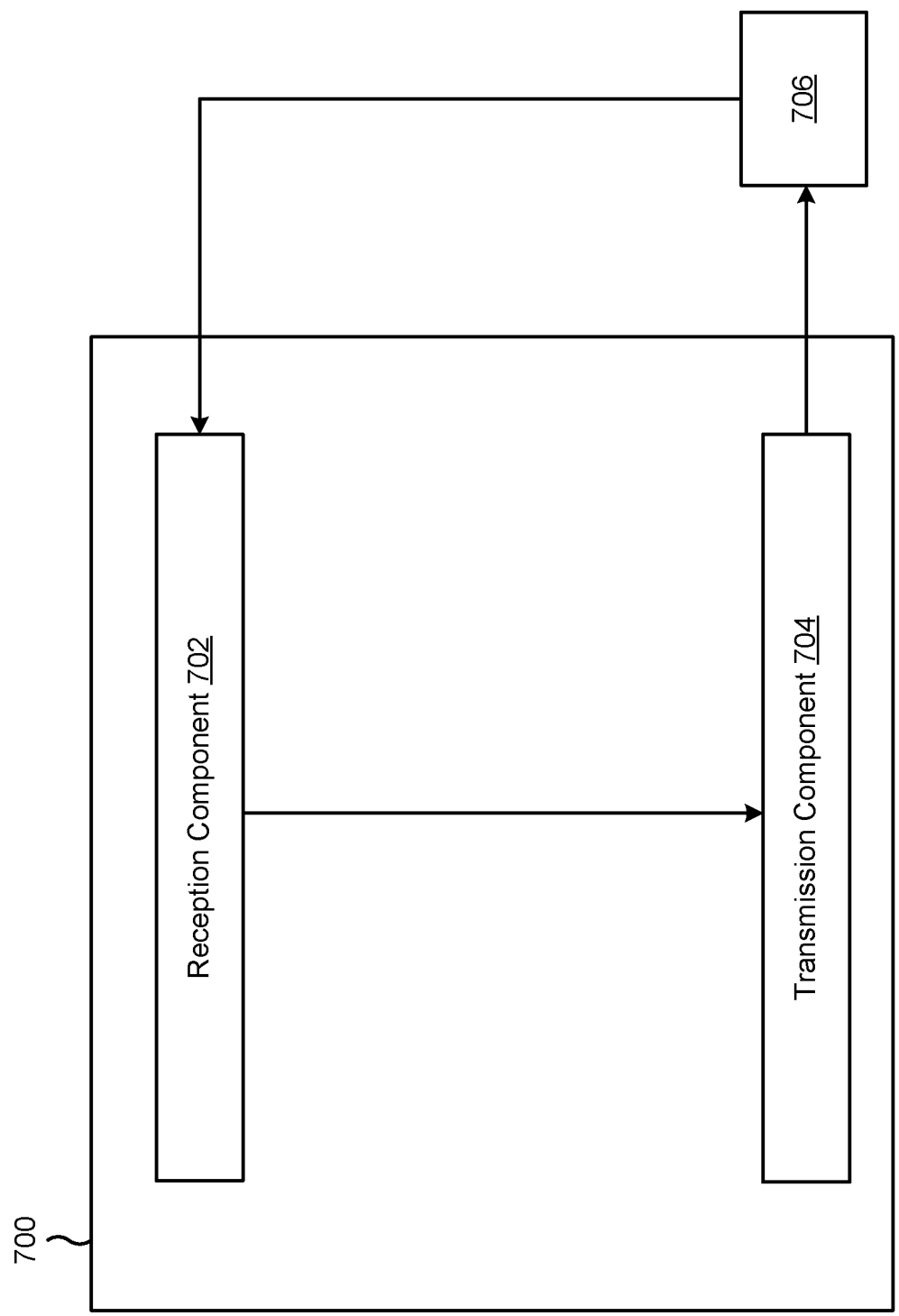
FIGS. 7-8 are diagrams of example apparatuses for wireless communication, in accordance with the present disclosure.

FIG. 7 is a diagram of an example apparatus 700 for wireless communication. The apparatus 700 may be a source MeNB, or a source MeNB may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the source MeNB described in connection with FIG. 2.

Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the source MeNB described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the source MeNB described in connection with FIG. 2. In some aspects, the transmission component 704 may be co-located with the reception component 702 in a transceiver.

The transmission component 704 may transmit, to a target NG-RAN node, a handover required message to initiate an inter-system handover from an EN-DC system associated with the source MeNB to an NR SA system associated with the target NG-RAN node, the source MeNB having an indirect path to the target NG-RAN node and a source SgNB having a direct path to the target NG-RAN node. The transmission component 704 may transmit, to the target NG-RAN node and based at least in part on the handover required message, forwarded data via the indirect path between the source MeNB and the target NG-RAN node through a core network, the indirect path being configured for indirect data forwarding for MN terminated bearers. The reception component 702 may receive, from a network entity, addresses for direct data forwarding for SN terminated bearers.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
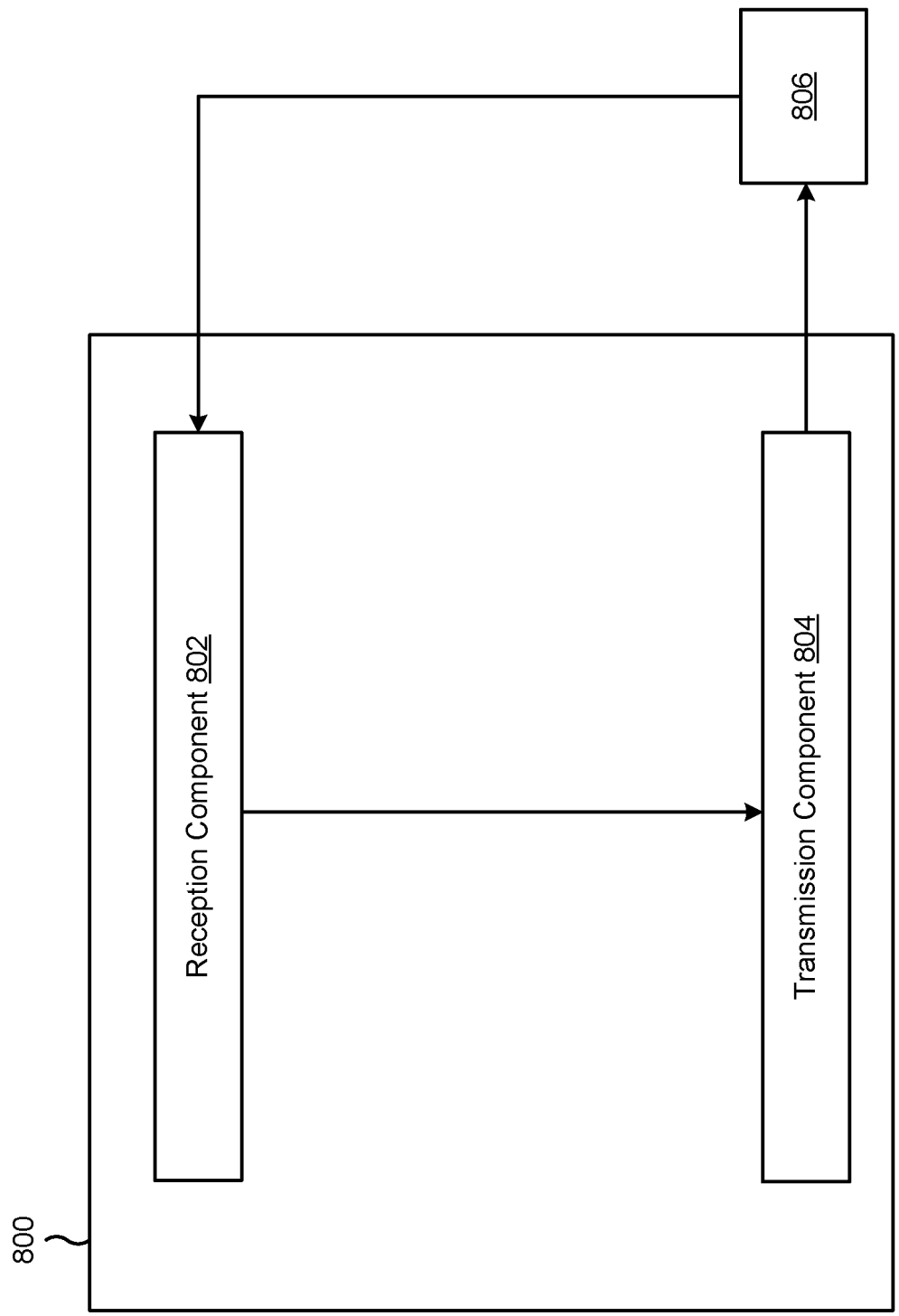

FIG. 8 is a diagram of an example apparatus 800 for wireless communication. The apparatus 800 may be a source NG-RAN node, or a source NG-RAN node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the source NG-RAN node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the source NG-RAN node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the source NG-RAN node described in connection with FIG. 2. In some aspects, the transmission component 804 may be co-located with the reception component 802 in a transceiver.

The transmission component 804 may transmit, to a network entity, a handover required message to initiate an inter-system handover from an NR SA system associated with the source NG-RAN node to an EN-DC system associated with a target MeNB, the source NG-RAN node having an indirect path to the target MeNB and the source NG-RAN node having a direct path to a target SgNB. The transmission component 804 may transmit, to the target MeNB and based at least in part on the handover required message, forwarded data via the indirect path between the source NG-RAN node and the target MeNB through a core network, the indirect path being configured for indirect data forwarding for MN terminated bearers. The reception component 802 may receive, from the network entity, addresses for direct data forwarding of the forwarded data for SN terminated bearers.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a source master eNodeB (MeNB), comprising: transmitting, to a target Next Generation radio access network (NG-RAN) node, a handover required message to initiate an inter-system handover from an evolved-Universal Mobile Telecommunications System (UMTS) terrestrial radio access network (E-UTRAN) New Radio (NR) dual connectivity (EN-DC) system associated with the source MeNB to an NR standalone (SA) system associated with the target NG-RAN node, the source MeNB having an indirect path to the target NG-RAN node and a source secondary gNodeB (SgNB) having a direct path to the target NG-RAN node; transmitting, to the target NG-RAN node and based at least in part on the handover required message, forwarded data via the indirect path between the source MeNB and the target NG-RAN node through a core network, the indirect path being configured for indirect data forwarding for master node (MN) terminated bearers; and receiving, from a network entity, addresses for direct data forwarding for secondary node (SN) terminated bearers.

Aspect 2: The method of Aspect 1, wherein the handover required message does not include a direct forwarding path availability information element to indicate that the source MeNB has the indirect path to the target NG-RAN node.

Aspect 3: The method of any of Aspects 1 through 2, further comprising: receiving, from the network entity, a handover command message that indicates addresses for the indirect data forwarding for the MN terminated bearers.

Aspect 4: The method of any of Aspects 1 through 3, wherein the handover required message includes a source-to-target container that indicates the direct path between the source SgNB and the target NG-RAN node for the direct data forwarding for the SN terminated bearers; and further comprising: receiving, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target NG-RAN node.

Aspect 5: The method of Aspect 4, further comprising: transmitting, to the source SgNB, a message that indicates the addresses for the direct data forwarding for the SN terminated bearers, as indicated in the handover command message.

Aspect 6: The method of any of Aspects 1 through 5, further comprising: receiving, from the network entity, a handover command message that indicates addresses for the indirect data forwarding for the MN terminated bearers; and ignoring the addresses for the indirect data forwarding for the MN terminated bearers, as indicated in the handover command message, based at least in part on the forwarded data being transmitted from the source MeNB to the target NG-RAN node via the source SgNB for the MN terminated bearers.

Aspect 7: The method of any of Aspects 1 through 6, further comprising: receiving, from the network entity, a handover command message that includes a target-to-source container that indicates addresses for direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a target-to-source container of a handover request acknowledge message transmitted by the target NG-RAN node.

Aspect 8: The method of Aspect 7, further comprising: transmitting, to the source SgNB, a message that indicates the addresses for the direct data forwarding for the plurality of data bearers, as indicated in the handover command message; and receiving, from the source SgNB, a message that indicates addresses associated with the source SgNB, wherein the forwarded data for the MN terminated bearers is provided from the source MeNB to the source SgNB based at least in part on the addresses associated with the source SgNB, and wherein the forwarded data is provided by the source SgNB to the target NG-RAN node based at least in part on the addresses for the direct data forwarding for the plurality of data bearers, as indicated in the handover command message.

Aspect 9: The method of any of Aspects 1 through 8, wherein the handover required message includes a direct forwarding path availability information element to indicate that either the source MeNB or the source SgNB has the direct path to the target NG-RAN node.

Aspect 10: The method of any of Aspects 1 through 9, further comprising: receiving, from the network entity, a handover command message that indicates addresses for direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a handover request acknowledge message transmitted by the target NG-RAN node.

Aspect 11: The method of any of Aspects 1 through 10, further comprising: configuring, prior to the inter-system handover, a plurality of bearers associated with the source MeNB to be the SN terminated bearers for data forwarding purposes, wherein the handover required message indicates a direct forwarding path availability information element to indicate that the source SgNB has the direct path to the target NG-RAN node.

Aspect 12: A method of wireless communication performed by a source Next Generation radio access network (NG-RAN) node, comprising: transmitting, to a network entity, a handover required message to initiate an inter-system handover from a New Radio (NR) standalone (SA) system associated with the source NG-RAN node to an evolved-Universal Mobile Telecommunications System (UMTS) terrestrial radio access network (E-UTRAN) New Radio dual connectivity (EN-DC) system associated with a target master eNodeB (MeNB), the source NG-RAN node having an indirect path to the target MeNB and the source NG-RAN node having a direct path to a target secondary gNodeB (SgNB); transmitting, to the target MeNB and based at least in part on the handover required message, forwarded data via the indirect path between the source NG-RAN node and the target MeNB through a core network, the indirect path being configured for indirect data forwarding for master node (MN) terminated bearers; and receiving, from the network entity, addresses for direct data forwarding of the forwarded data for secondary node (SN) terminated bearers.

Aspect 13: The method of Aspect 12, wherein the handover required message does not include a direct forwarding path availability information element to indicate that the source NG-RAN node has the indirect path to the target MeNB.

Aspect 14: The method of any of Aspects 12 through 13, further comprising: receiving, from the network entity, a handover command message that indicates addresses for the indirect data forwarding for the MN terminated bearers.

Aspect 15: The method of any of Aspects 12 through 14, further comprising: receiving, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target MeNB, and wherein the target SgNB indicates the addresses for the direct data forwarding of the SN terminated bearers in an SN addition request acknowledge message transmitted to the target MeNB.

Aspect 16: The method of any of Aspects 12 through 15, further comprising: receiving, from the network entity, a handover command message that indicates addresses for the indirect data forwarding for the MN terminated bearers; and ignoring the addresses for the indirect data forwarding for the MN terminated bearers, as indicated in the handover command message, based at least in part on the forwarded data being transmitted from the source NG-RAN node to the target MeNB via the target SgNB for the MN terminated bearers.

Aspect 17: The method of any of Aspects 12 through 16, wherein an SgNB addition request message transmitted from the target MeNB to the target SgNB indicates addresses associated with the target MeNB, wherein the forwarded data for the MN terminated bearers is provided from the source NG-RAN node to the target MeNB based at least in part on the addresses associated with the target MeNB.

Aspect 18: The method of any of Aspects 12 through 17, wherein an SgNB addition request acknowledge message transmitted from the target SgNB to the target MeNB indicates addresses for direct data forwarding for a plurality of data bearers associated with the inter-system handover, wherein the plurality of data bearers include the MN terminated bearers and the SN terminated bearers.

Aspect 19: The method of any of Aspects 12 through 18, further comprising: receiving, from the network entity, a handover command message that includes a target-to-source container that indicates addresses for the direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a target-to-source container of a handover request acknowledge message transmitted by the target MeNB.

Aspect 20: The method of any of Aspects 12 through 19, wherein the forwarded data for the MN terminated bearers is provided by the target SgNB to the target MeNB based at least in part on the addresses for the direct data forwarding, as indicated in an SgNB addition request message.

Aspect 21: An apparatus for wireless communication at a device, comprising a processor; memory coupled with the processor; and instructions stored in the memory and executable by the processor to cause the apparatus to perform the method of one or more of Aspects 1-11.

Aspect 22: A device for wireless communication, comprising a memory and one or more processors coupled to the memory, the one or more processors configured to perform the method of one or more of Aspects 1-11.

Aspect 23: An apparatus for wireless communication, comprising at least one means for performing the method of one or more of Aspects 1-11.

Aspect 24: A non-transitory computer-readable medium storing code for wireless communication, the code comprising instructions executable by a processor to perform the method of one or more of Aspects 1-11.

Aspect 25: A non-transitory computer-readable medium storing a set of instructions for wireless communication, the set of instructions comprising one or more instructions that, when executed by one or more processors of a device, cause the device to perform the method of one or more of Aspects 1-11.

Aspect 26: An apparatus for wireless communication at a device, comprising a processor; memory coupled with the processor; and instructions stored in the memory and executable by the processor to cause the apparatus to perform the method of one or more of Aspects 12-20.

Aspect 27: A device for wireless communication, comprising a memory and one or more processors coupled to the memory, the one or more processors configured to perform the method of one or more of Aspects 12-20.

Aspect 28: An apparatus for wireless communication, comprising at least one means for performing the method of one or more of Aspects 12-20.

Aspect 29: A non-transitory computer-readable medium storing code for wireless communication, the code comprising instructions executable by a processor to perform the method of one or more of Aspects 12-20.

Aspect 30: A non-transitory computer-readable medium storing a set of instructions for wireless communication, the set of instructions comprising one or more instructions that, when executed by one or more processors of a device, cause the device to perform the method of one or more of Aspects 12-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a + b, a + c, b + c, and a + b + c, as well as any combination with multiples of the same element (e.g., a + a, a + a + a, a + a + b, a + a + c, a + b + b, a + c + c, b + b, b + b + b, b + b + c, c + c, and c + c + c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at an source master eNodeB (MeNB), comprising:
a memory; and
one or more processors, coupled to the memory, configured to:
transmit, to a target Next Generation radio access network (NG-RAN) node, a handover required message to initiate an inter-system handover from an evolved-Universal Mobile Telecommunications System (UMTS) terrestrial radio access network (E-UTRAN) New Radio (NR) dual connectivity (EN-DC) system associated with the source MeNB to an NR standalone (SA) system associated with the target NG-RAN node, the source MeNB having an indirect path to the target NG-RAN node and a source secondary gNodeB (SgNB) having a direct path to the target NG-RAN node;
transmit, to the target NG-RAN node and based at least in part on the handover required message, forwarded data via the indirect path between the source MeNB and the target NG-RAN node through a core network, the indirect path being configured for indirect data forwarding for master node (MN) terminated bearers; and
receive, from a network entity, addresses for direct data forwarding for secondary node (SN) terminated bearers.

2. The apparatus of claim 1, wherein the handover required message does not include a direct forwarding path availability information element to indicate that the source MeNB has the indirect path to the target NG-RAN node.

3. The apparatus of claim 1, wherein the one or more processors are further configured to:
receive, from the network entity, a handover command message that indicates addresses for the indirect data forwarding for the MN terminated bearers.

4. The apparatus of claim 1, wherein the handover required message includes a source-to-target container that indicates the direct path between the source SgNB and the target NG-RAN node for the direct data forwarding for the SN terminated bearers; and wherein the one or more processors are further configured to:
receive, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target NG-RAN node.

5. The apparatus of claim 4, wherein the one or more processors are further configured to:
transmit, to the source SgNB, a message that indicates the addresses for the direct data forwarding for the SN terminated bearers, as indicated in the handover command message.

6. The apparatus of claim 1, wherein the one or more processors are further configured to:
receive, from the network entity, a handover command message that indicates addresses for the indirect data forwarding for the MN terminated bearers; and
ignore the addresses for the indirect data forwarding for the MN terminated bearers, as indicated in the handover command message, based at least in part on the forwarded data being transmitted from the source MeNB to the target NG-RAN node via the source SgNB for the MN terminated bearers.

7. The apparatus of claim 1, wherein the one or more processors are further configured to:
receive, from the network entity, a handover command message that includes a target-to-source container that indicates addresses for direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a target-to-source container of a handover request acknowledge message transmitted by the target NG-RAN node.

8. The apparatus of claim 7, wherein the one or more processors are further configured to:
transmit, to the source SgNB, a message that indicates the addresses for the direct data forwarding for the plurality of data bearers, as indicated in the handover command message; and
receive, from the source SgNB, a message that indicates addresses associated with the source SgNB, wherein the forwarded data for the MN terminated bearers is provided from the source MeNB to the source SgNB based at least in part on the addresses associated with the source SgNB, and wherein the forwarded data is provided by the source SgNB to the target NG-RAN node based at least in part on the addresses for the direct data forwarding for the plurality of data bearers, as indicated in the handover command message.

9. The apparatus of claim 1, wherein the handover required message includes a direct forwarding path availability information element to indicate that either the source MeNB or the source SgNB has the direct path to the target NG-RAN node.

10. The apparatus of claim 1, wherein the one or more processors are further configured to:
receive, from the network entity, a handover command message that indicates addresses for direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a handover request acknowledge message transmitted by the target NG-RAN node.

11. The apparatus of claim 1, wherein the one or more processors are further configured to:
configure, prior to the inter-system handover, a plurality of bearers associated with the source MeNB to be the SN terminated bearers for data forwarding purposes, wherein the handover required message indicates a direct forwarding path availability information element to indicate that the source SgNB has the direct path to the target NG-RAN node.

12. An apparatus for wireless communication at a source Next Generation radio access network (NG-RAN) node, comprising:
a memory; and
one or more processors, coupled to the memory, configured to:
transmit, to a network entity, a handover required message to initiate an inter-system handover from a New Radio (NR) standalone (SA) system associated with the source NG-RAN node to an evolved-Universal Mobile Telecommunications System (UMTS) terrestrial radio access network (E-UTRAN) New Radio dual connectivity (EN-DC) system associated with a target master eNodeB (MeNB), the source NG-RAN node having an indirect path to the target MeNB and the source NG-RAN node having a direct path to a target secondary gNodeB (SgNB);

transmit, to the target MeNB and based at least in part on the handover required message, forwarded data via the indirect path between the source NG-RAN node and the target MeNB through a core network, the indirect path being configured for indirect data forwarding for master node (MN) terminated bearers; and receive, from the network entity, addresses for direct data forwarding of the forwarded data for secondary node (SN) terminated bearers.

13. The apparatus of claim 12, wherein the handover required message does not include a direct forwarding path availability information element to indicate that the source NG-RAN node has the indirect path to the target MeNB.

14. The apparatus of claim 12, wherein the one or more processors are further configured to:
receive, from the network entity, a handover command message that indicates addresses for the indirect data forwarding for the MN terminated bearers.

15. The apparatus of claim 12, wherein the one or more processors are further configured to:
receive, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target MeNB, and wherein the target SgNB indicates the addresses for the direct data forwarding of the SN terminated bearers in an SN addition request acknowledge message transmitted to the target MeNB.

16. The apparatus of claim 12, wherein the one or more processors are further configured to:
receive, from the network entity, a handover command message that indicates addresses for the indirect data forwarding for the MN terminated bearers; and
ignore the addresses for the indirect data forwarding for the MN terminated bearers, as indicated in the handover command message, based at least in part on the forwarded data being transmitted from the source NG-RAN node to the target MeNB via the target SgNB for the MN terminated bearers.

17. The apparatus of claim 12, wherein an SgNB addition request message transmitted from the target MeNB to the target SgNB indicates addresses associated with the target MeNB, wherein the forwarded data for the MN terminated bearers is provided from the source NG-RAN node to the target MeNB based at least in part on the addresses associated with the target MeNB.

18. The apparatus of claim 12, wherein an SgNB addition request acknowledge message transmitted from the target SgNB to the target MeNB indicates addresses for direct data forwarding for a plurality of data bearers associated with the inter-system handover, wherein the plurality of data bearers include the MN terminated bearers and the SN terminated bearers.

19. The apparatus of claim 12, wherein the one or more processors are further configured to:

receive, from the network entity, a handover command message that includes a target-to-source container that indicates addresses for the direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a target-to-source container of a handover request acknowledge message transmitted by the target MeNB.

20. The apparatus of claim 12, wherein the forwarded data for the MN terminated bearers is provided by the target SgNB to the target MeNB based at least in part on the addresses for the direct data forwarding, as indicated in an SgNB addition request message.

21. A method of wireless communication performed by a source master eNodeB (MeNB), comprising:
transmitting, to a target Next Generation radio access network (NG-RAN) node, a handover required message to initiate an inter-system handover from an evolved-Universal Mobile Telecommunications System (UMTS) terrestrial radio access network (E-UTRAN) New Radio (NR) dual connectivity (EN-DC) system associated with the source MeNB to an NR standalone (SA) system associated with the target NG-RAN node, the source MeNB having an indirect path to the target NG-RAN node and a source secondary gNodeB (SgNB) having a direct path to the target NG-RAN node;
transmitting, to the target NG-RAN node and based at least in part on the handover required message, forwarded data via the indirect path between the source MeNB and the target NG-RAN node through a core network, the indirect path being configured for indirect data forwarding for master node (MN) terminated bearers; and
receiving, from a network entity, addresses for direct data forwarding for secondary node (SN) terminated bearers.

22. The method of claim 21, further comprising:
receiving, from the network entity, a handover command message that indicates addresses for the indirect data forwarding for the MN terminated bearers; or
transmitting, to the source SgNB, a message that indicates the addresses for the direct data forwarding for the SN terminated bearers, as indicated in the handover command message,
wherein the handover required message does not include a direct forwarding path availability information element to indicate that the source MeNB has the indirect path to the target NG-RAN node, or wherein the handover required message includes a direct forwarding path availability information element to indicate that either the source MeNB or the source SgNB has the direct path to the target NG-RAN node.

23. The method of claim 21, wherein the handover required message includes a source-to-target container that indicates the direct path between the source SgNB and the target NG-RAN node for the direct data forwarding for the SN terminated bearers; and further comprising:
receiving, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target NG-RAN node.

24. The method of claim 21, further comprising:

receiving, from the network entity, a handover command message that indicates addresses for the indirect data forwarding for the MN terminated bearers; and ignoring the addresses for the indirect data forwarding for the MN terminated bearers, as indicated in the handover command message, based at least in part on the forwarded data being transmitted from the source MeNB to the target NG-RAN node via the source SgNB for the MN terminated bearers.

25. The method of claim 21, further comprising:

receiving, from the network entity, a handover command message that includes a target-to-source container that indicates addresses for direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a target-to-source container of a handover request acknowledge message transmitted by the target NG-RAN node;

transmitting, to the source SgNB, a message that indicates the addresses for the direct data forwarding for the plurality of data bearers, as indicated in the handover command message; or receiving, from the source SgNB, a message that indicates addresses associated with the source SgNB, wherein the forwarded data for the MN terminated bearers is provided from the source MeNB to the source SgNB based at least in part on the addresses associated with the source SgNB, and wherein the forwarded data is provided by the source SgNB to the target NG-RAN node based at least in part on the addresses for the direct data forwarding for the plurality of data bearers.

26. The method of claim 21, further comprising:

receiving, from the network entity, a handover command message that indicates addresses for direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a handover request acknowledge message transmitted by the target NG-RAN node; or configuring, prior to the inter-system handover, a plurality of bearers associated with the source MeNB to be the SN terminated bearers for data forwarding purposes, wherein the handover required message indicates a direct forwarding path availability information element to indicate that the source SgNB has the direct path to the target NG-RAN node.

27. A method of wireless communication performed by a source Next Generation radio access network (NG-RAN) node, comprising:

transmitting, to a network entity, a handover required message to initiate an inter-system handover from a New Radio (NR) standalone (SA) system associated with the source NG-RAN node to an evolved-Universal Mobile Telecommunications System (UMTS) terrestrial radio access network (E-UTRAN) New Radio dual connectivity (EN-DC) system associated with a target master eNodeB (MeNB), the source NG-RAN node having an indirect path to the target MeNB and the source NG-RAN node having a direct path to a target secondary gNodeB (SgNB);

transmitting, to the target MeNB and based at least in part on the handover required message, forwarded data via the indirect path between the source NG-RAN node and the target MeNB through a core network, the indirect path being configured for indirect data forwarding for master node (MN) terminated bearers; and receiving, from the network entity, addresses for direct data forwarding of the forwarded data for secondary node (SN) terminated bearers.

28. The method of claim 27, further comprising:

receiving, from the network entity, a handover command message that includes a target-to-source container that indicates the addresses for the direct data forwarding for the SN terminated bearers, wherein the addresses for the direct data forwarding for the SN terminated bearers are indicated in a target-to-source container of a handover request acknowledge message transmitted by the target MeNB, and wherein the target SgNB indicates the addresses for the direct data forwarding of the SN terminated bearers in an SN addition request acknowledge message transmitted to the target MeNB; or receiving, from the network entity, a handover command message that includes a target-to-source container that indicates addresses for the direct data forwarding for a plurality of data bearers associated with the inter-system handover, wherein the plurality of data bearers include the MN terminated bearers and the SN terminated bearers, and wherein the addresses for the direct data forwarding for the plurality of data bearers are indicated in a target-to-source container of a handover request acknowledge message transmitted by the target MeNB; or receiving, from the network entity, a handover command message that indicates addresses for the indirect data forwarding for the MN terminated bearers.

29. The method of claim 27, further comprising:

receiving, from the network entity, a handover command message that indicates addresses for the indirect data forwarding for the MN terminated bearers; and ignoring the addresses for the indirect data forwarding for the MN terminated bearers, as indicated in the handover command message, based at least in part on the forwarded data being transmitted from the source NG-RAN node to the target MeNB via the target SgNB for the MN terminated bearers.

30. The method of claim 27, wherein:

an SgNB addition request message transmitted from the target MeNB to the target SgNB indicates addresses associated with the target MeNB, wherein the forwarded data for the MN terminated bearers is provided from the source NG-RAN node to the target MeNB based at least in part on the addresses associated with the target MeNB; or an SgNB addition request acknowledge message transmitted from the target SgNB to the target MeNB indicates addresses for direct data forwarding for a plurality of data bearers associated with the inter-system handover, wherein the plurality of data bearers include the MN terminated bearers and the SN terminated bearers; or the handover required message does not include a direct forwarding path availability information element to indicate that the source NG-RAN node has the indirect path to the target MeNB, or wherein the forwarded data for the MN terminated bearers is provided by the target SgNB to the target MeNB based at least in part on the addresses for the direct data forwarding, as indicated in an SgNB addition request message.

* * * * *